United States Patent [19]

Gauthier

[11] 4,382,230

[45] May 3, 1983

[54] MOVEMENT SENSOR WITH PLATE FORMING SINGLE TURN COILS

[75] Inventor: Gérard Gauthier, Paris, France

[73] Assignee: Thomson-CSF, Paris, France

[21] Appl. No.: 162,789

[22] Filed: Jun. 25, 1980

[30] Foreign Application Priority Data

Jun. 29, 1979 [FR] France ............................... 79 16904

[51] Int. Cl.³ .......................... G01B 7/14; H01F 27/28
[52] U.S. Cl. ..................................... 324/207; 336/73; 336/110
[58] Field of Search .................. 324/207, 208; 336/73, 336/110, 75

[56] References Cited

U.S. PATENT DOCUMENTS 3,502,966  3/1970  Perets et al. .......................... 324/208
4,028,686  6/1977  Wilson et al. ........................ 324/173
4,134,091  1/1979  Rogers ................................ 336/61

FOREIGN PATENT DOCUMENTS 2134751  1/1973  Fed. Rep. of Germany .
2311383  12/1976  France .
836549  1/1960  United Kingdom .

Primary Examiner—Gerard R. Strecker
Assistant Examiner—Walter E. Snow
Attorney, Agent, or Firm—Cushman, Darby & Cushman

[57] ABSTRACT

A magneto-electric sensor for sensing the movement of a moving part in a severe environment, comprising a magnetic circuit, in front of the pole faces of which moves a permanent magnet connected to the mobile part, and electric windings at the terminals of which the induced voltages are collected, wherein said windings are reduced to two turns formed by cutting out the support plate of the magnetic circuit, and connected in parallel to said terminals.

10 Claims, 6 Drawing Figures

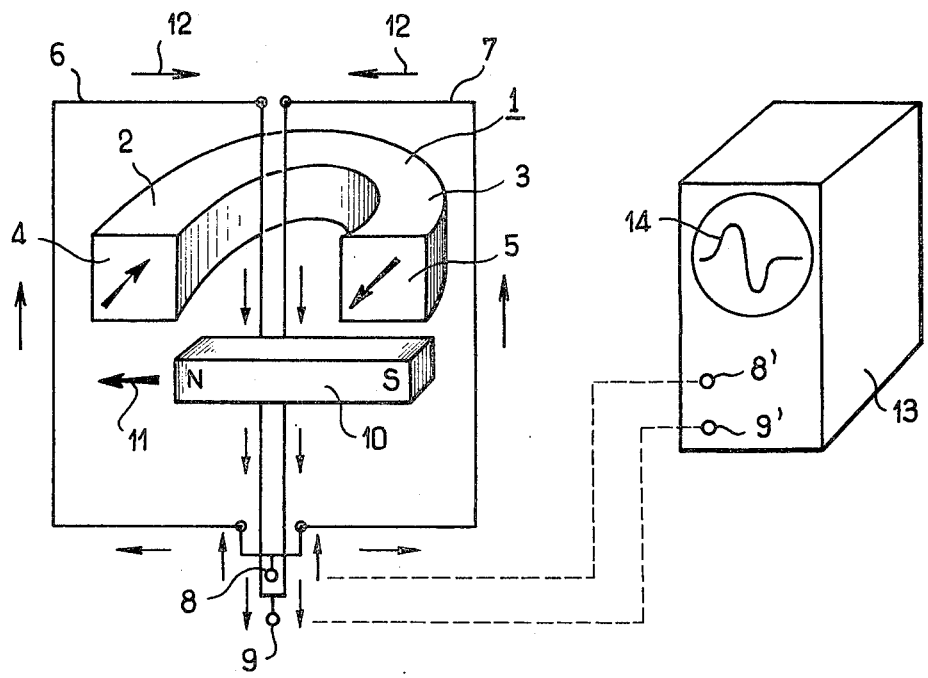
FIG_1
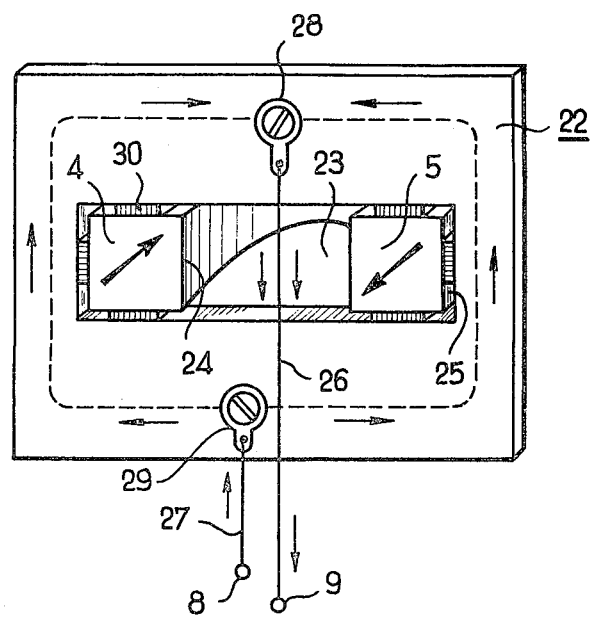
FIG_2

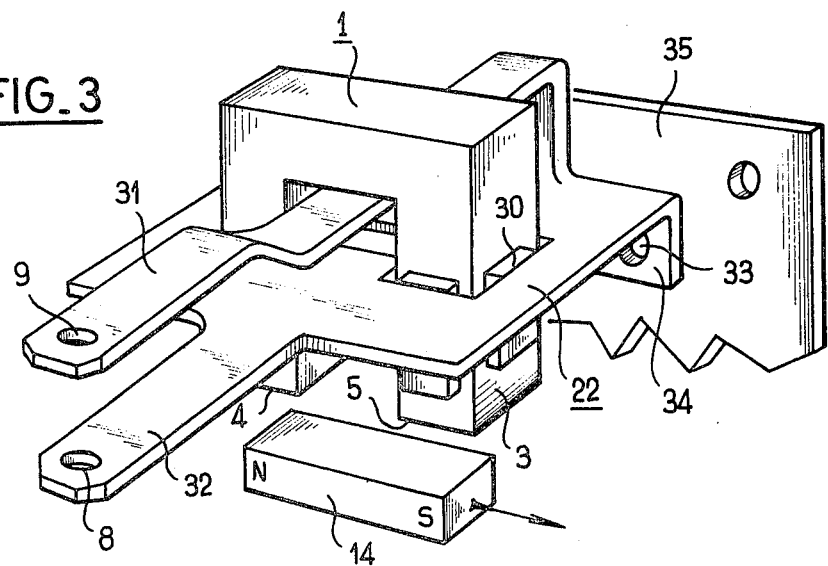
FIG._3
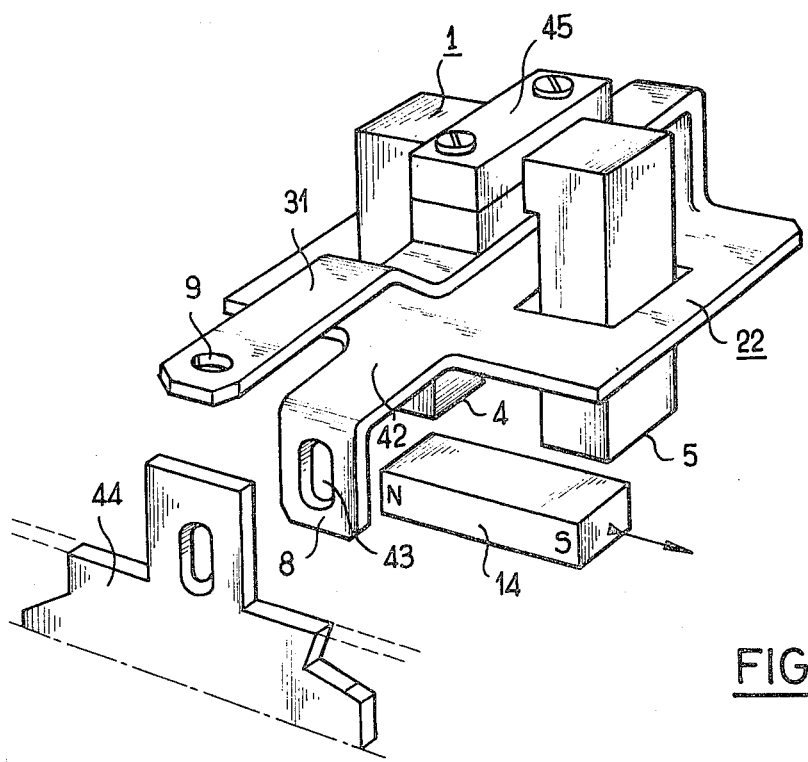
FIG._4

4,382,230

MOVEMENT SENSOR WITH PLATE FORMING SINGLE TURN COILS

BACKGROUND OF THE INVENTION

The present invention relates to the field of magneto-electric transducer devices for sensing movement. These devices use a magnetic circuit having an air-gap in the neighborhood of which may move a ferromagnetic bar propelled with the movement to be revealed. An electric circuit in the form of a coil is wound around the magnetic circuit and, during the movement of the bar, it is the seat of an electric voltage tied to any variation of a magnetic flux which might be created therein.

This flux may come from a source of magnetism such as a magnetized bar, either inserted in the fixed circuit, or formed, after magnetization, by the mobile ferromagnetic bar itself. The electric voltages or currents thus created are finally used in suitable measuring devices.

Such sensors are widely used in practice, and their construction is now well-known, adapted to the different conditions of use normally met with in practice.

It is a different matter when the environmental conditions are more severe, particularly those which concern the temperatures. Thus, picking up the movement of mobile elements in an aircraft reactor requires satisfactory operation at temperatures of more than 400° C. The use of conventional coils, of the multi-turn type is then to be discarded, as well as connections electrically insulated by organic sheaths, and the presence and/or the length of connections is even to be strictly limited, for example by forming one of them by means of the "ground" return, if the support of the device is electrically conducting.

SUMMARY OF THE INVENTION

The aim of the present invention is to satisfy these requirements. Basically, it calls on a special embodiment of the coil, in the typical form of a pair of convolutions respectively disposed about two portions of the magnetic circuit close to its air-gap, these turns being connected in parallel and being obtained by cutting out, along suitable outlines, a conducting plate capable of assuming moreover the function of a support for the magnetic circuit.

More precisely, the present invention relates to a magneto-electric movement sensor for sensing the movement of a moving part, comprising, on the one hand, a flat magnetic circuit in the shape of a horseshoe with two branches terminating in two pole faces defining an air-gap and, on the other hand, an electric circuit comprising two convolutions, each surrounding respectively one branch of the magnetic circuit, these turns being the seat of an induced voltage when a magnetic flux variation is caused in the magnetic circuit by the movement, in front of the two pole faces, of a ferro-magnetic element integral with the mobile part, characterized in that said convolutions, connected in parallel across two connecting terminals, are formed by portions of a plate made from a conducting material, assuming simultaneously the function of support for the magnetic circuit.

The invention will be better understood with the help of the following description, with reference to the accompanying figures.

DESCRIPTION OF THE FIGURES

FIG. 1 shows a simplified diagram for explaining a known movement sensor.

FIG. 2 shows a first embodiment of the invention of the movement sensor of FIG. 1.

FIG. 3 shows a second embodiment, comprising connections obtained by bending from the support plate.

FIG. 4 shows a third embodiment, where one of the connections of the preceding embodiment is provided by a ground return.

DESCRIPTION OF THE PREFERRED EMBODIMENTS

Figure 5:
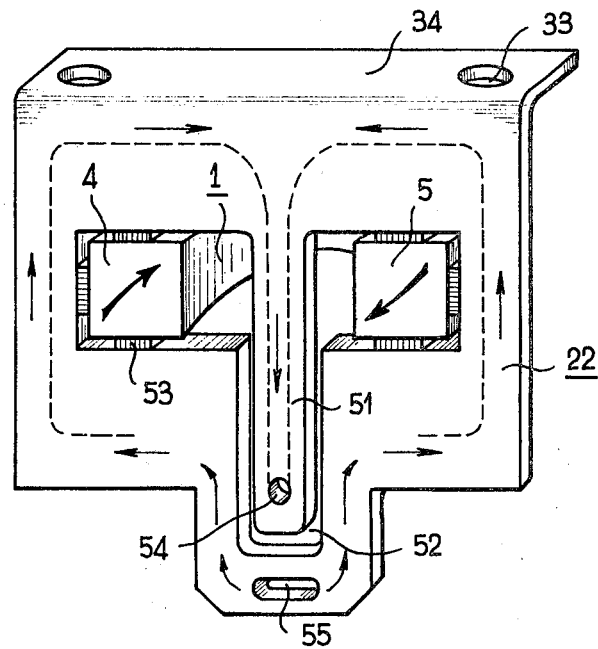
FIGS. 5 and 6 show two other embodiments similar to those of FIGS. 3 and 4, but not comprising any bending for the connections.

FIG. 1 shows a simplified diagram for explaining a known type of movement sensor.

It comprises an open ferro-magnetic circuit 1, having two branches 2 and 3 and two pole faces 4 and 5, and an electric circuit surrounding it, formed from two convolutions or turns 6 and 7, connected in parallel to terminals 8 and 9.

The operation of such a sensor makes use of a variation of a magnetic flux flowing in the ferro-magnetic circuit, caused by a magnetized bar 10, whose movement is tied to the one which it is required to reveal for the mobile element concerned.

In the case of FIG. 1 for example, pole face 4 close to the north pole of the bar, will be penetrated by an increasing magnetic flux when the bar moves in the direction of arrow 11; the currents created in turns 6 and 7 by the flux variation will flow in the direction of arrows 12, and will be collected in parallel on terminals 8 and 9.

The electric signal collected is then fed to terminals 8' and 9' of a measuring apparatus such as a cathode-ray oscilloscope, ensuring ready detection thereof by simple visualization of the variation of the signal on the screen, in the form of a plot usable in a wide variety of practical applications.

This type of connection of parallel turns, where the current is proportional to the number of turns, must be distinguished from the connection of series turns, where it is the voltage which increases proportional to the number of turns.

It is the current connection which forms one of the features of the present invention, for it lends itself to embodiments particularly well adapted to operation in a severe or adverse environment.

FIG. 2 shows a first embodiment, in accordance with the invention, of the movement sensor of FIG. 1.

It comprises a magnetic circuit 21 similar to that of FIG. 1, but the electric circuit is formed by a flat plate 22, made from a conducting material, having an aperture at its center 23 where the ends 24 and 25 of the magnetic circuit may penetrate.

Two connecting wires 26 and 27 are connected at two points 28 and 29 on the plate so that one of them, the common wire 26 of the parallel connection, forms, by passing between the branches of the magnetic circuit, the equivalent of the two turns 6 and 7 of FIG. 1. Plate 22 assumes moreover the function of a support for magnetic circuit 21, by means of insulating fixing plates such as 30.

The use of wires leads however to the need for a complicated insulation, with respect to the support, of at least one of the connections 26, which acts as common wire.

FIG. 3 shows a second embodiment of the sensor comprising certain connections obtained by bending directly from the support plate.

Wire 26 of FIG. 2 is here in the form of a strip 31 cut out from support plate 22, and folded back parallel thereto to form the common branch of the two convolutions 6 and 7 of FIG. 1, passing between the ends 2 and 3 of the magnetic circuit.

The second wire 27 of FIG. 2 is formed simply by a strip 32 obtained directly by cutting out the support plate whose function as a support for the sensor, on a frame 35, is ensured by the fixing apertures such as 33, carried by a strip bent into the form of a bracket such as 34.

FIG. 4 shows a third embodiment where one of the connections of the preceding embodiment is provided by a ground return.

The second connection 42 is here bent into the shape of a bracket with a hole 43 intended for fixing the sensor to the assembly frame 44 of the apparatus or of the machine where it is used. The advantage of this embodiment resides in the fact that, if this frame is electrically conducting, a single wire for connecting with the measuring device is required, the other connecting ire being replaced by what is usually designated under the name "ground return," i.e. the conducting frame itself. In this embodiment, there is used by way of variation, a means of fixing the magnetic circuit directly onto the first connection through an insulating ceramic block 45.

Figure 6:
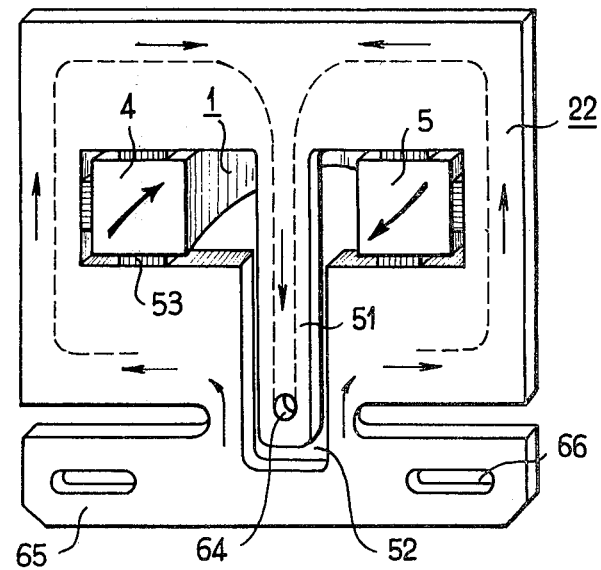

FIGS. 5 and 6 show two other embodiments similar to those of FIGS. 3 and 4, but not comprising any bending to obtain the common branch of the two turns of the electric circuit.

For that, the electric insulation required for this branch is provided by an opening made in the support plate, the common wire 51 being entirely surrounded by an open slit 52 with respect to the rest of the plate.

Insulating blocks such as 53, made from a ceramic material for example, fix the magnet to the plate.

The two cases of connection already described for FIGS. 3 and 4 are also provided here: FIG. 5 shows a position sensor whose two terminals 54 and 55 are connectable by wires; FIG. 6 shows the case where a single terminal 64 is connected, the second connection being replaced, as already explained, by a "ground return" of the conducting frame, through plate 65, provided with fixing holes such as 66.

In the preceding description, it has been indicated that the magneto-electric sensors in accordance with the embodiments of the invention were connected following a so-called "current" connection; now the measuring apparatus usually available are sensitive to electric voltages; it is then advisable to connect them to the sensors of the invention through a voltage-boosting transformer.

Moreover, the description has been made, within the scope of the figures where a permanent magnet has been shown, for a movement of this latter parallel to the north-south axis. Any other movement capable of creating an induced current in the electric circuit is included within the scope of the invention, in particular that where the movement of the magnet is perpendicular to the north-south axis.

Finally, the description has been made in the case of a magnet moving in front of the pole faces of a non-magnetized ferro-magnetic circuit.

The provision of a permanent magnet in all or part of the fixed magnetic circuit, the mobile element being formed by a non-magnetized bar, also forms part of the invention.

What is claimed is:

1. A movement sensor for sensing the movement of a moving part comprising:
    a magnetic circuit in the form of a horseshoe with two branches terminating in pole faces defining an air-gap; and
    an electric circuit comprising coil means defining a pair of single-turn coils connected in parallel between two connecting terminals, each branch of the magnetic circuit being surrounded by a said single turn coil respectively, and a ferro-magnetic element integral with the said moving part, one of said magnetic circuit and said element being magnetized for inducing a current in said single-turn coils by the magnetic flux variation caused by the movement in front of the pole faces, said coil means including a flat plate made from a conducting material, and forming the said single-turn coils, the plate having at least one aperture through which the ends of said branches pass so as to support said magnetic circuit and being connected to said connecting terminals, one of the connections passing between the said branches to provide both a common wire of the parallel connection and a common wire of the said single-turn coils and means for insulating said plate from said magnetic circuit.

2. A movement sensor as claimed in claim 1, wherein the two connection points are situated on a same side of the said plate, the common wire of the parallel connection being disposed between the two branches of the magnetic circuit.

3. A movement sensor as claimed in claim 2, wherein the common wire of the parallel connection is parallel to the plate and obtained by cutting out and bending the plate.

4. A movement sensor as claimed in claim 3, wherein the magnetic circuit is supported by the said common connecting wire, to which this circuit is fixed through a block of electrically insulating material.

5. A movement sensor as claimed in claim 4, wherein said insulating material is a ceramic material.

6. A movement sensor as claimed in claim 2, wherein the common wire of the parallel connection is an isolated wire in the plane of the support plate.

7. A movement sensor as claimed in claim 6, wherein the two connections are constituted by portions of the plate one portion constituting the said common wire and being delimited by an opened slit, and another portion allowing a ground return type connection thereof.

8. A movement sensor as claimed in any one of claims 1 to 7, wherein said magnetic circuit comprises a portion having permanent magnetization.

9. A system for detecting the movement of a moving part comprising:
    a fixed device formed by a movement sensor in accordance with any one of claims 1 to 7; and
    a circuit for measuring the voltage induced in said coils in said coil means.

10. A movement detection system comprising:
    a fixed device formed from a movement sensor in accordance with claim 8; and
    a circuit for measuring the voltage induced in said coils.

* * * * *